United States Patent [19]

Ziolkowski

[11] Patent Number: 4,959,559

[45] Date of Patent: Sep. 25, 1990

[54] ELECTROMAGNETIC OR OTHER DIRECTED ENERGY PULSE LAUNCHER

[75] Inventor: Richard W. Ziolkowski, Livermore, Calif.

[73] Assignee: The United States of America as represented by the United States Department of Energy, Washington, D.C.

[21] Appl. No.: 331,141

[22] Filed: Mar. 31, 1989

[51] Int. Cl.[5] .......................... H01Q 3/26; H04B 1/12; H01S 3/23; H01S 3/30

[52] U.S. Cl. .................................... 307/425; 307/510; 307/522; 342/14; 342/13; 342/81; 364/822; 315/409

[58] Field of Search .................................... 342/13–20, 342/81, 378, 379–391; 364/724.16, 725–727, 819–824, 841–849; 328/168–171, 233; 307/425, 430, 510, 511, 515, 522, 527; 350/96.11; 315/409

[56] References Cited

U.S. PATENT DOCUMENTS

| | | | |
|---|---|---|---|
| 4,032,922 | 6/1977 | Provencher | 342/81 X |
| 4,216,475 | 8/1980 | Johnson | 364/725 X |
| 4,270,223 | 5/1981 | Marston | 328/169 X |
| 4,321,550 | 3/1982 | Evtuhov | 307/425 X |
| 4,342,949 | 8/1982 | Harte et al. | 315/409 |
| 4,595,994 | 6/1986 | Verber et al. | 364/841 |
| 4,641,259 | 2/1987 | Shan et al. | 364/724.16 |
| 4,656,601 | 4/1987 | Merritt et al. | 364/821 |
| 4,779,984 | 10/1988 | Cook | 350/96.11 X |
| 4,806,888 | 2/1989 | Salvage et al. | 307/511 X |

*Primary Examiner*—Stanley D. Miller
*Assistant Examiner*—David R. Bertelson
*Attorney, Agent, or Firm*—Henry P. Sartorio; L. E. Carnahan; William R. Moser

[57] ABSTRACT

The physical realization of new solutions of wave propagation equations, such as Maxwell's equations and the scaler wave equation, produces localized pulses of wave energy such as electromagnetic or acoustic energy which propagate over long distances without divergence. The pulses are produced by driving each element of an array of radiating sources with a particular drive function so that the resultant localized packet of energy closely approximates the exact solutions and behaves the same.

20 Claims, 11 Drawing Sheets

ELECTROMAGNETIC OR OTHER DIRECTED ENERGY PULSE LAUNCHER

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention relates generally to transmission of pulses of energy, and more particularly to the propagation of localized pulses of electromagnetic or acoustic energy over long distances without divergence.

As the Klingon battle cruiser attacks the Starship Enterprise, Captain Kirk commands "Fire photon torpedoes". Two darts or blobs of light speed toward their target to destory the enemy spaceship. Stardate 1989, Star Trek reruns, or 3189, somewhere in intergalactic space. Fantasy or reality. The ability to launch localized packets of light or other energy which do not diverge as they travel great distances through space may incredibly be at hand.

Following the pioneering work of J. N. Brittingham, various groups have been actively pursuing the possibility that solutions to the wave equation can be found that allow the transmission of localized, slowly decaying pulses of energy, variously described as electromagnetic missiles or bullets, Bessel beams, transient beam fields, and splash pulses. These efforts have in common the space-time nature of the solutions being investigated and their potential launching mechanisms, pulse-driven antennas.

Brittingham's original work involved a search, over a period of about 15 years, for packet-like solutions of Maxwell's equations (the equations that describe how electromagnetic waves propagate). The solutions sought were to be continuous and nonsingular (well-behaved, realizable), three-dimensional in pulse structure (localized), and nondispersive for all time (faithfully maintaining their shape). They were also to move at the velocity of light in straight lines and carry finite electromagnetic energy. The solutions discovered, termed focus wave modes (FWMs), had all the aforementioned properties except the last; like plane-wave solutions to the same equations, they were found to have finite energy density but infinite energy, despite all attempts to remove this deficiency, and thus are not physically realizable.

Conventional methods for propagation of energy pulses are based on simple solutions to Maxwell's equations and the wave equation. Spherical or planar waveforms are utilized. Beams of energy will spread as they propagate as a result of diffraction effects. For a source of diameter D and wavelength of λ the distance to which a pulse will propagate without substantial spread is the Rayleigh length $D^2/\lambda$.

Present arrays are based on phasing a plurality of elements, all at the same frequency, to tailor the beam using interference effects. In a conventional antenna system, such as a phased array driven with a monochromatic signal, only spatial phasing is possible. The resulting diffraction-limited signal pulse begins to spread and decay when it reaches the Rayleigh length $L_R$. For an axisymmetric geometry, an array of radius a, and a driving wavelength of λ, $L_R$ is about $a^2/\lambda$.

There have been several previous attempts to achieve localized transmission beyond this Rayleigh distance with conventional systems. The best known of these are the super-gain or super-directive antennas, where the goal was to produce a field whose amplitude decays as one over the distance from the antenna, but whose angular spread can be as narrow as desired. There are theoretical solutions to this problem, but they turn out to be impractical; the smallest deviation from the exact solution completely ruins the desired characteristics.

The original FWMs can be related to exact solutions of the three-dimensional scalar wave equation in a homogeneous, isotropic medium (one that has the same properties at any distance in all directions). This equation has solutions that describe, for example, the familiar spherical acoustic waves emanating from a sound source in air.

The FWMs are related to solutions that represent Gaussian beams propagating with only local deformation, i.e., a Gaussian-shaped packet that propagates with changes only within the packet. Such a pulse, moving along the z axis, with transverse distance denoted by ρ, $$\Phi_k(r,t) = e^{ik(z+ct)}\left[\frac{e^{-k\rho^2/[z_0+i(z-ct)]}}{4\pi i[z_o + i(z-ct)]}\right]$$

is an exact solution of the scalar wave equation developed by applicant. This fundamental pulse is a Gaussian beam that translates through space-time with only local variations. These pulses can also form components of solutions to Maxwell's equations.

These fundamental Gaussian pulses have a number of interesting characteristics. They appear as either a transverse plane wave or a particle, depending on whether k is small or large. Moreover, for all k they share with plane waves the property of having finite energy density but infinite total energy.

Thus traditional solutions to the wave equation and Maxwell's equations do not provide a means for launching pulses from broadband sources which can travel desirable distances without divergence problems. The laser is a narrowband light source which has a relatively low divergence over certain distances (i.e. relatively long Rayleigh length). However, acoustic and microwave sources, because of longer wavelengths, are more severely limited. Phased arrays do not provide the solution.

Accordingly, it is an object of the invention to provide method and apparatus for launching electromagnetic and acoustic pulses which can travel distances much larger than the Rayleigh length without divergence.

It is also an object of the invention to provide method and apparatus for launching pulses which approximate new solutions to the scalar wave and Maxwell's equations.

It is another object of the invention to physically realize new solutions to the scalar wave and Maxwell's equations which provide localized packets of energy which transverse large distances without divergence.

It is a further object of the invention to provide compact arrays for launching these pulses.

SUMMARY OF THE INVENTION

The invention is method and apparatus for launching electromagnetic and acoustic energy pulses which propagate long distances without substantial divergence. A preferred embodiment of the invention is based on the recognition that a superposition of the FWM pulses can produce finite-energy solutions to the wave equation and to Maxwell's equations. As with plane waves, the infinite-energy property is not an insurmountable drawback per se. The variable k in the solution provides an added degree of freedom, and these fundamental Gaussian pulse fields can be used as basis functions, a superposition of which represent new transient solutions of the wave equation. In other words, these infinite-energy solutions can be added together, with the proper weighting, to yield physically realizable, finite-energy solutions. More generally, the invention applies to any nonseparable space-time solution $\Phi_k(\bar{r},t)$ of the relevant wave propagation equation, and may in some cases even be based on an approximate solution.

For example, either the real or imaginary part of the function $$f(r,t) = \int_0^{\infty} \Phi_k(r,t)F(k)dk$$

(where $\Phi_k$ is the exact solution or an approximation thereof) is also an exact, source-free solution of the wave equation. The F(k) function is the weighting function (the spectrum), and the resulting pulses having finite energy if F(k) satisfies certain integrability conditions. This representation utilizes basis functions that are localized in space and, by their very nature, are a natural basis for synthesizing pulse solutions that can be tailored to give directed wave energy transfer in space. A bidirectional representation is also possible, which leads to analogous solutions in geometries that have boundaries (propagation of waves in waveguides).

Solutions to Maxwell's equations follow naturally from these scalar wave equation solutions. Such electromagnetic pulses, characterized by their high directionality and slow energy decay, are called electromagnetic directed-energy pulse trains (EDEPTs). They are a step closer to a classical description of a photon, a finite-energy solution of Maxwell's equations that exhibits a wave/particle duality. The corresponding acoustic pulses, which are solutions of the scalar wave equation, are called ADEPTs.

In most general terms, the invention starts with a solution $\Phi_k( ,t)$ of the relevant wave equation (scaler wave equation, Maxwell's equations or other equations), chooses an appropriate weighing or spectrum function F(k), computes a drive function f(r,t) and applies the appropriate drive function to each element of an array to launch pulses of wave energy.

The invention particularly applies to broadband sources such as acoustic and microwave sources. Each element of an array of radiating elements is driven by the appropriate driving function for that individual element. The array is preferably a finite planar array, and may be folded to produce a more compact configuration.

DETAILED DESCRIPTION OF THE PREFERRED EMBODIMENT

The invention is method and apparatus for launching localized pulses of energy which substantially approximate EDEPTs, electromagnetic directed energy pulse trains, which are exact pulse solutions of Maxwell's equations in an isotropic, homogeneous medium, or ADEPTs, acoustic directed energy pulse trains, which are exact pulse solutions of the acoustic (scalar) wave equation in an isotropic, homogeneous medium. In a preferred embodiment, both classes of solutions can be constructed from "Focus Wave Modes", which are exact solutions that represent Gaussian beams translating through space with only local deformations. However, the principles of the invention apply to any waveform $\Phi_k(r,t)$ which is a nonseparable space-time solution to the relevant wave equations. The relevant wave propagation equations are typically the scalar wave equation and/or Maxwell's equations, but in some cases other wave equations may apply. Approximate solutions may in some cases be substituted for exact solutions.

If c is the propagation speed of waves in this medium, the axisymmetric solution ($\rho^2=x^2+y^2$)

$$\Phi_k(r,t) = e^{ik(z+ct)} \frac{e^{-k\rho^2/[z_o+i(z-ct)]}}{4\pi i[z_o + i(z-ct)]}, \quad (1)$$

is a moving, Gaussian pulse modulated by a plane wave. It can have either a plane wave or a particle-like character depending on whether k is small or large. An added degree of freedom has been introduced into the solution through the variable k, and these fundamental Gaussian pulse fields can be used as basis functions to represent new transient solutions of the wave equation and to launch pulses. In particular, if $s(\rho,z,t)=\rho^2/[z_o+i(z-ct)]-i(z+ct)$, the function $$f(r,t) = \int_0^\infty \Phi_k(r,t)F(k)dk = \quad (2)$$

$$\frac{1}{4\pi i[z_o + i(z-ct)]} \int_0^\infty dkF(k)\, e^{-ks(\rho,z,t)},$$

is also an exact source-free solution of the wave equation and provides the drive functions for a source array. In contrast to plane wave decompositions, it uses basis functions that are localized in space-time and hence, by their very nature, are a natural basis for synthesizing finite energy pulse solutions that can be tailored to give directed wave energy transfer in space. In particular, the representation yields finite energy solutions of the scalar wave equation if F(k) satisfies $$\int_0^\infty dk|F(k)|^2 e^{2kz_o}E_1(2kz_o) < \frac{1}{2z_o} \int_0^\infty dk|F(k)|^2 \frac{1}{k} < \infty, \quad (3)$$

where $E_n(x)$ is the exponential integral function of order n. This occurs, for example, if $k^{-\frac{1}{2}}F(k)$ is square integrable.

Figure 1A:
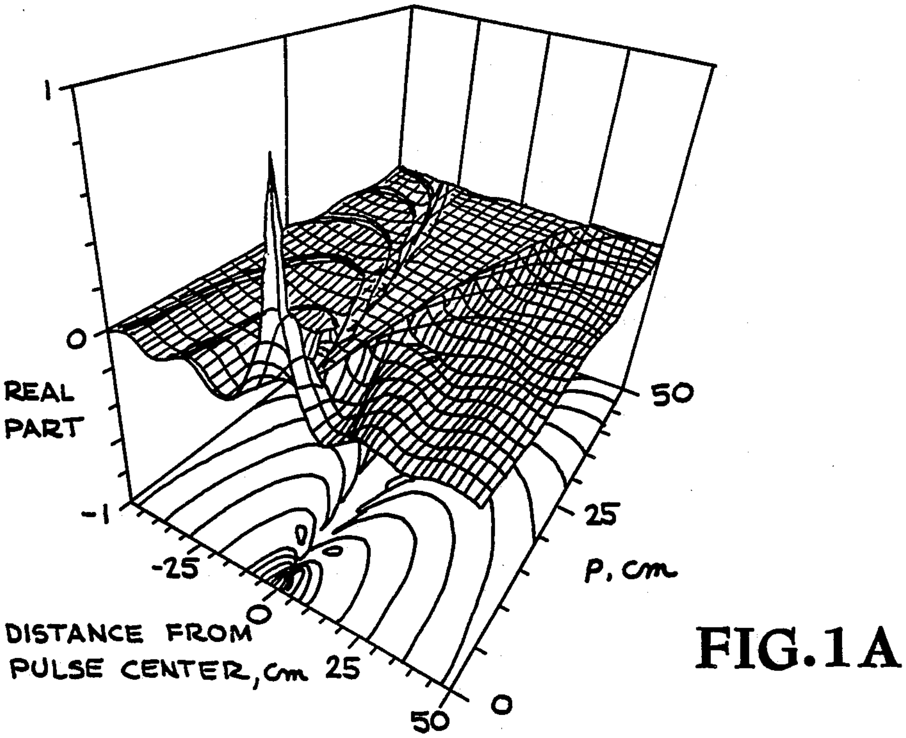
FIGS. 1A and B show surface plots and corresponding contours of a Gaussian electromagnetic pulse with $z_o=1$ cm and k=0.333/cm at the initial position t=0, pulse center at z=0, and at $t=\pi$ ms with pulse center at z=942 km, respectively.
Figure 1B:
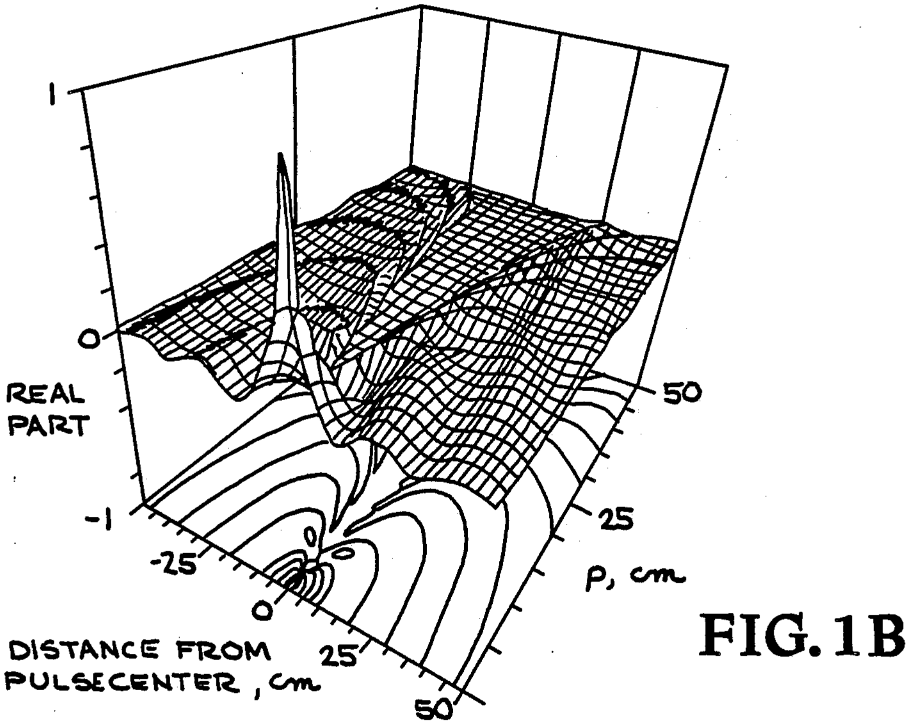
Figure 2A:
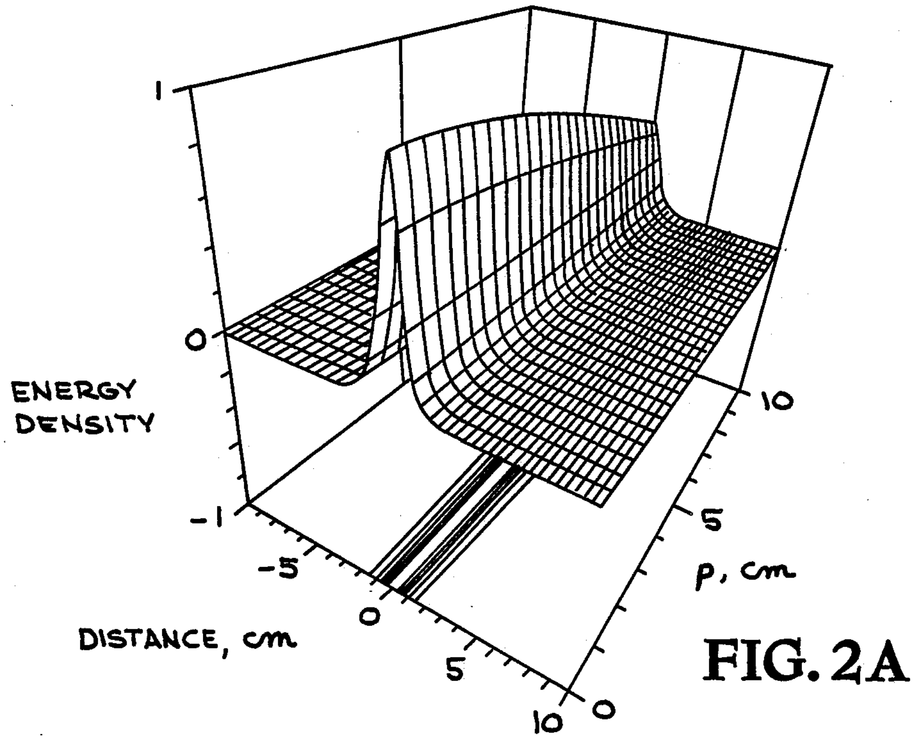
FIGS. 2A and B show the energy density of a spread Gaussian pulse (small k, wavelike) and localized Gaussian pulse (large k, particle-like), respectively.
Figure 2B:
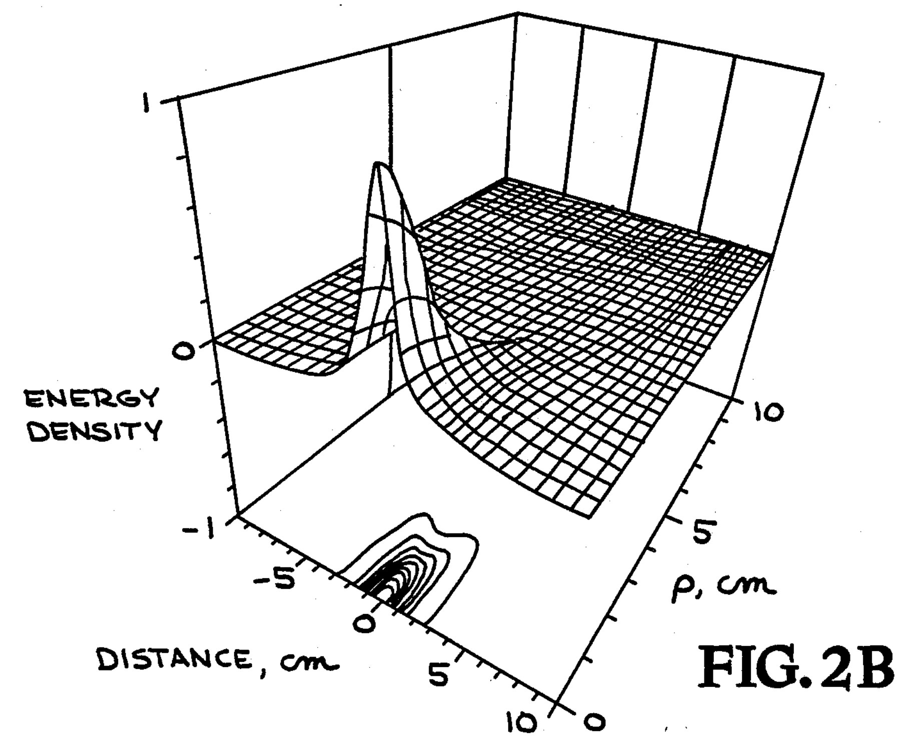

FIGS. 1A and B show scaled plots of the fundamental Gaussian pulse of Equation (1). The spatial variation about the pulse center at t=0, z=0 and t=πms, z=942 km is shown; the pulse is moving in the positive z direction at the speed of light. FIGS. 2 A and B show the energy density of the fundamental Gaussian pulse (real part of $[4\pi i\Phi_k]2$), respectively, for small k where the pulse looks like a transverse plane wave, and for large k where the pulse is very localized and looks like a particle.

A preferred embodiment of the invention for producing pulses which closely approximate the theoretical solutions is based on the spectral function $$F(k)=4\pi i\beta(\beta k-b)^{\alpha-1}e^{-\alpha(\beta k-b)}H(k-b/\beta)/\Gamma(\alpha)$$

derived by scaling and truncating a power spectrum, where H(x) is Heaviside's function and Γ(x) is the Gamma function. This spectrum yields the associated modified power spectrum (MPS) pulse (drive function):

$$f(r,t) = Re\left[\frac{1}{z_0 + i(z-ct)} \frac{1}{\left(\frac{s}{\beta} + a\right)^{\alpha}} e^{-bs/\beta}\right], \quad (4)$$

where α and β are parameters that are chosen to achieve specific characteristics, and s is defined as before.

The physical characteristics of the MPS pulse are very appealing. This pulse can be optimized so that it is localized and its original amplitude is recovered out to extremely large distances from its initial location. In particular, for a distance $z << \beta/2b$ and $z < \beta a/2$, the amplitude of the pulse at the pulse center is constant. It then becomes oscillatory with an oscillation length of $\pi/b$ in an intermediate zone, $\beta/2b < z < \beta a/2$, recovering its original amplitude when $z=n\ (\pi\beta/b)$, n being any positive integer. Finally, when the observation point is very far away from the origin, $z>\beta a/2$, the MPS pulse decays like $1/z^{\alpha}$. Therefore, the initial amplitude of the MPS pulse is recovered until the distance $z\sim\beta a/2.$, and since β is a free parameter, this distance can be made arbitrarily large. The transverse behavior of this MPS pulse at the pulse center is essentially $f(\rho,z=ct)\sim\exp(-b\rho^2/\beta z)\ f(O,z=ct)$. Thus, by adjusting the ratio $b/\beta z_o$, one can adjust the degree of transverse localization. The MPS pulse is also localized longitudinally, decaying along z as $1/[_o^2+(z-ct)^2]$away from the pulse center.

To produce localized transmission (high directionality) and slow energy decay, the parameters a, b, α, βB , and $z_o$ of the MPS pulse are selected to achieve a pulse within the microwave spectrum and possibly within the realm of our physical appreciation and experience. In particular, set the MPS parameters to be a=1 m, α=1, $b=10^{14}$/m, $\beta=6\times10^{15}$, and $z_o$=1 cm. The peak of the spectrum of this pulse is in the microwave region at 8.4 GHz. (However, these parameters can be varied to design pulses with similar characteristics in different frequency regimes.)

Figure 3A:
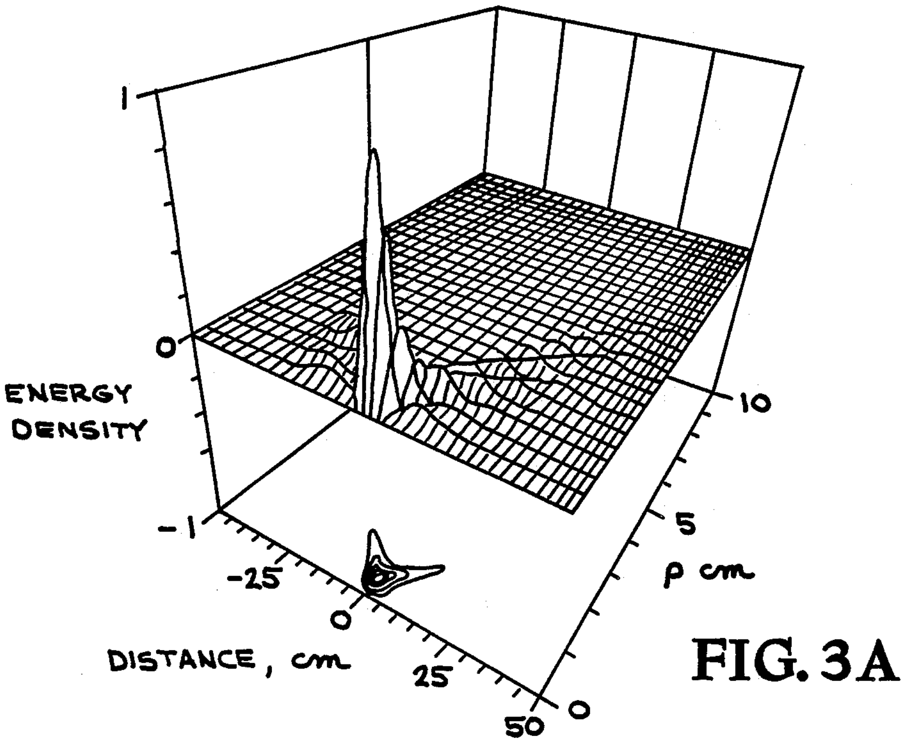
FIGS. 3 A and B show the field energy density of the electromagnetic MPS pulse with a=1 m, $\alpha=1$, $b=10^{14}$/m, $\beta=6\times10^{15}$, and $z_o=1$ cm, normalized to its maximum value at t=0, at t=0, z=0 and at $t=10^4$ sec, $z=9.42\times10^9$ km, respectively.
Figure 3B:
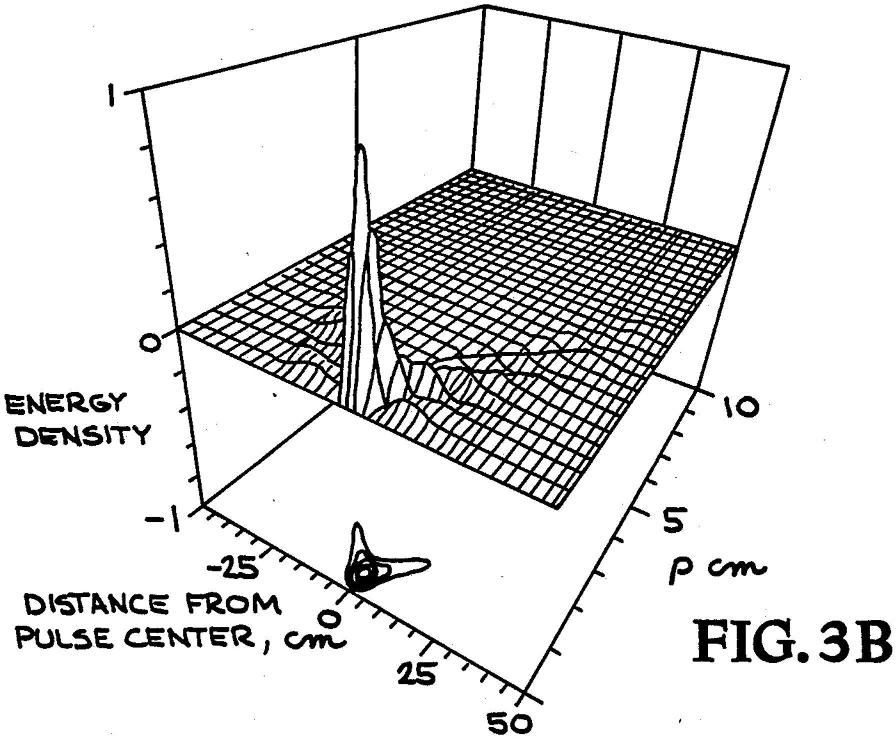

FIGS. 3A and B show surface plots and the corresponding contour plots of the electromagnetic energy density of the electromagnetic MPS pulse relative to the pulse center locations z=0 km and $9.42\times10^9$ km (9.42 billion kilometers, farther than from Earth to Pluto). These results definitively show the localization of the field near the direction of propagation over very large distances. The recovery of the initial energy density in this case actually occurs out to $z=\beta a/2=3.00\times10^{12}$ km (about one-third light year).

Figure 4A:
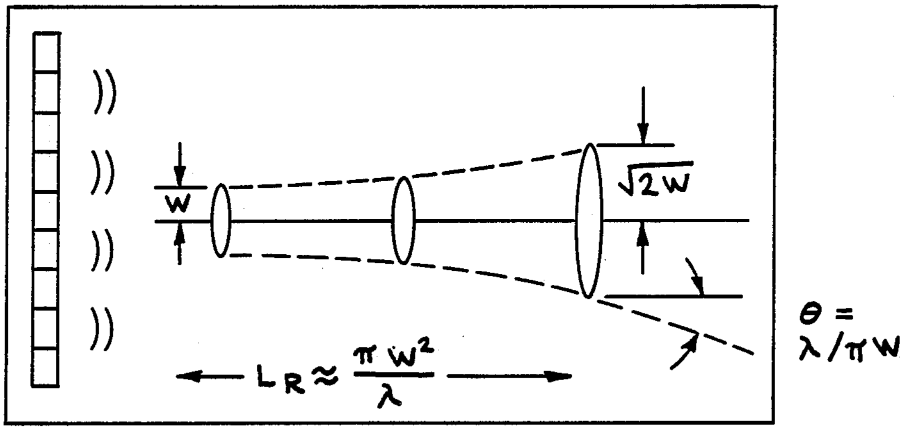
FIGS. 4A and B compare a traditional Gaussian beam solution of the wave equation with a localized transmission solution of the invention which has a large bandwidth and maintains its spatial and temporal frequency distribution over long distances.
Figure 4B:
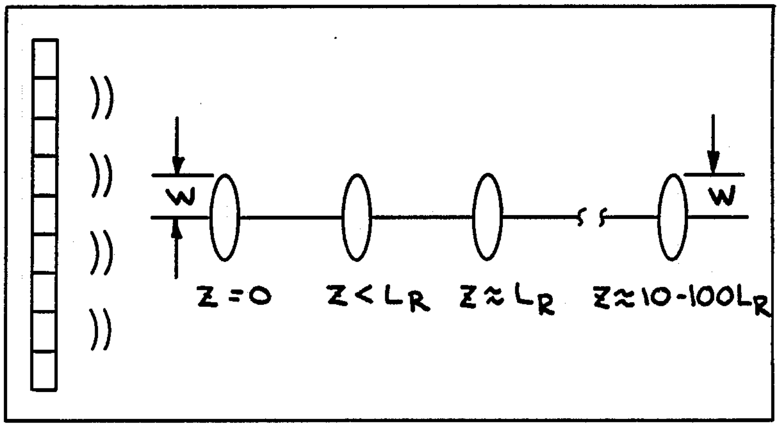

A comparison of this specific choice of pulse representation and the classically popular Gaussian beam shows that the electromagnetic MPS pulse characteristics are dramatically better. As shown in FIGS. 4 A and B the waist of zero-order Gaussian beam field at z=0 is w and λ is its wavelength. Along the direction of propagation its amplitude varies as $1/[1+(\lambda z\ \pi w^2)^2]^{\frac{1}{2}}$ so that the distance to the near/far-field boundary or Rayleigh length, where it begins to decay as 1/z, is nominally reached when $z\sim\pi w^2/\lambda$. The square of the amplitude at that point is half its initial value and its radius has spread to $\sqrt{2}$ w and increases (diverges) as $\theta z\sim(\lambda/\pi w)z$ in the far-field.

With the above MPS pulse parameters, the waist w of an equivalent Gaussian beam$=(b/\beta z_o)^{-\frac{1}{2}}$=1.3 m. The highest frequency of the spectrum for this MPS pulse is $f_{max}$ =50 GHz; the corresponding wavelength is $\lambda_{min}=c/f_{max}$ =6 mm. For the equivalent diffraction-limited Gaussian beam field these defining parameters give the distance to the far-field as 0.872 km and the spread of the field at $10^{10}$ km as $1.5\times10^7$ km. The field amplitude at $10^{10}$ km is essentially $10^{-10}$its initial value. The localization of the electromagnetic MPS pulse near the z-axis and the recovery of its initial amplitude well beyond the classical far-field distance confirms that the MPS pulse has propagation characteristics that are much better than the corresponding diffraction-limited Hermite-Gaussian laser field.

The generation of pulses of energy that satisfy the wave equation and provide localized transmission of energy requires an antenna, or finite planar array of radiating elements, which produces fields that are substantially similar to the exact mathematical solutions so that the resulting pulses behave substantially as predicted.

Ideally, the antenna system is a finite planar array of point sources each of which radiates spherical pulses that can be combined using a Huygens representation into the array field. (The Rayleigh distance for a point source is zero, so we are always in the far field of each radiating element and can readily obtain the overall field response of the array by superposition.)

Figure 5:
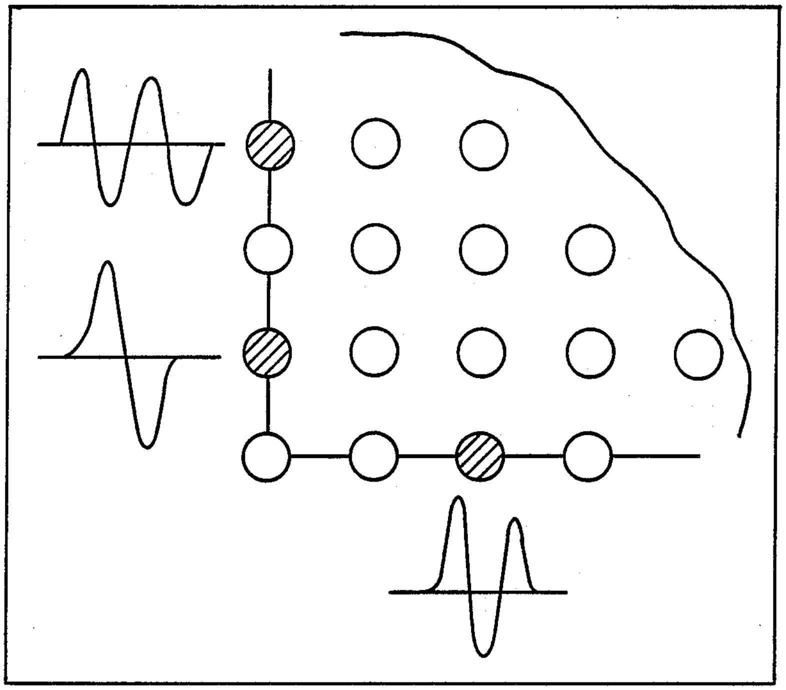
FIG. 5 is one quadrant of a schematic ADEPT-/EDEPT planar array of radiating sources, each driven with a particular time function having a large frequency bandwidth, with three representative driving pulses, each different, shown for three individual radiating elements.

The antennas, as illustrated in FIG. 5, include circular, rectangular, and hexagonal arrays of equally spaced elements. The arrays may be planar or nonplanar. The driving function for each element is a broad-bandwidth waveshape determined from the exact wave-equation solution and its derivatives. This is marked contrast to conventional arrays, whose elements are driven with monochromatic signals. The elements include ultrasonic acoustic transducers (piezoelectric) and microwave sources such as dipoles, horns, etc. The invention can also be applied to lasers and other sources.

Figure 6:
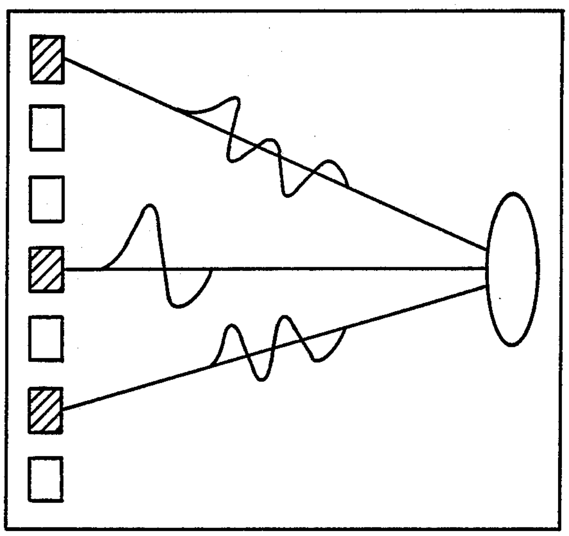
FIG. 6 illustrates how pulses radiated by each element in the array combine to form a resulting localized packet of wave energy.

As shown in FIG. 6, the resulting field (the sum of these individually radiated time histories) is a localized pulse that maintains its shape and compactness at distances well beyond the conventional Rayleigh distance. Furthermore, the ADEPT/EDEPT-driven arrays appear to be very robust (not strongly sensitive either to parameters defining the array or to perturbations in the initial aperture distributions).

Figure 7A:
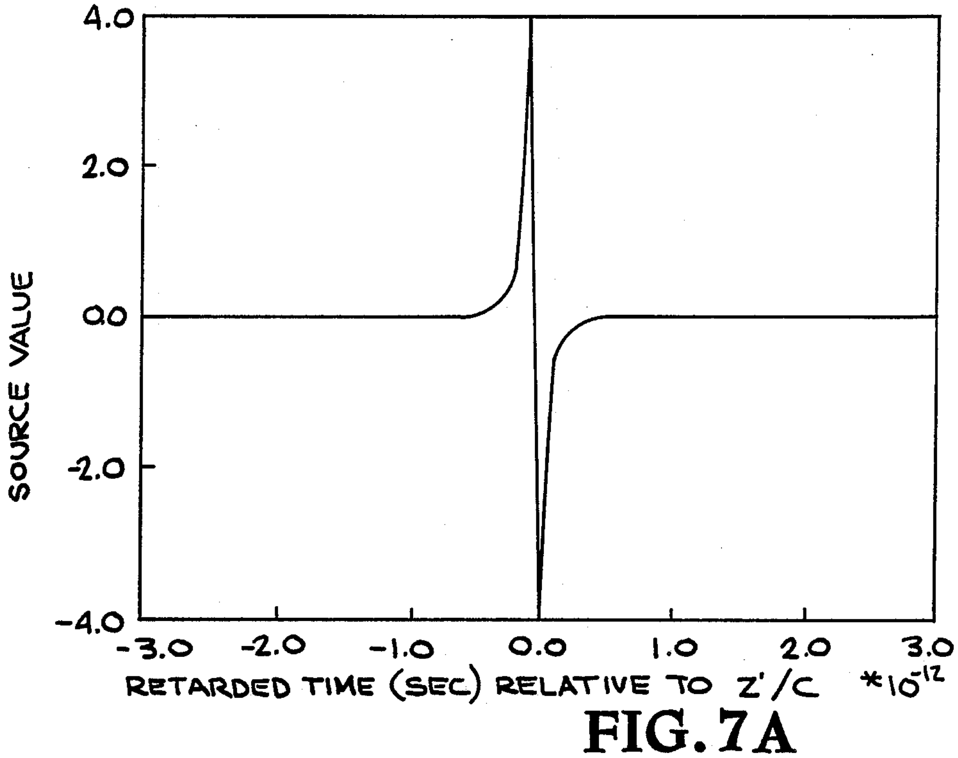
FIGS. 7A, B illustrate a drive function applied to the center of an array, and its frequency spectrum.
Figure 7B:
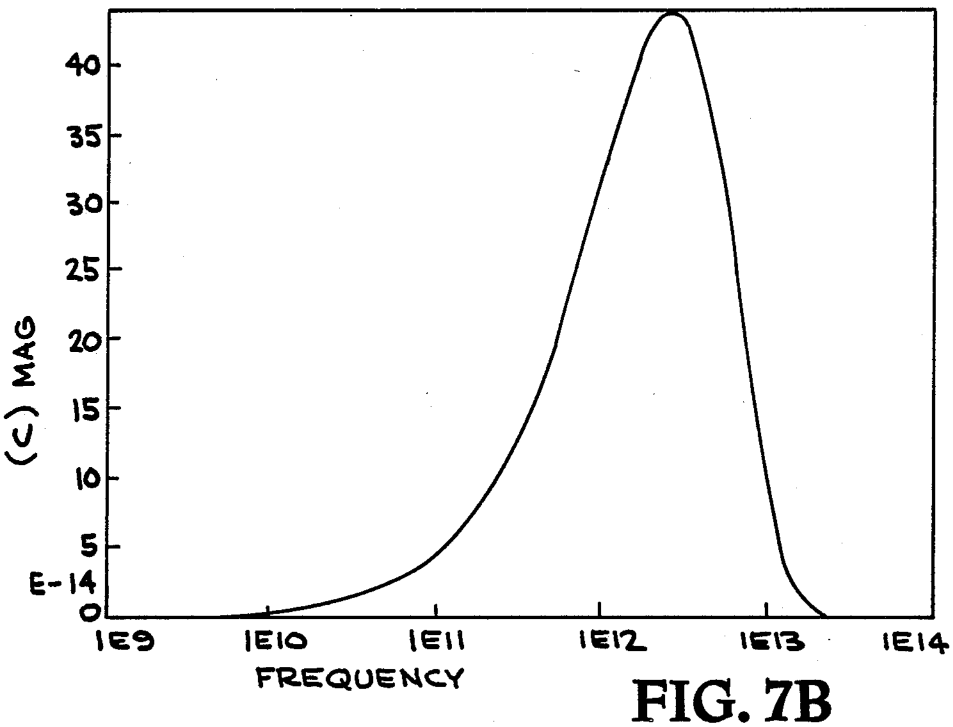
Figure 8A:
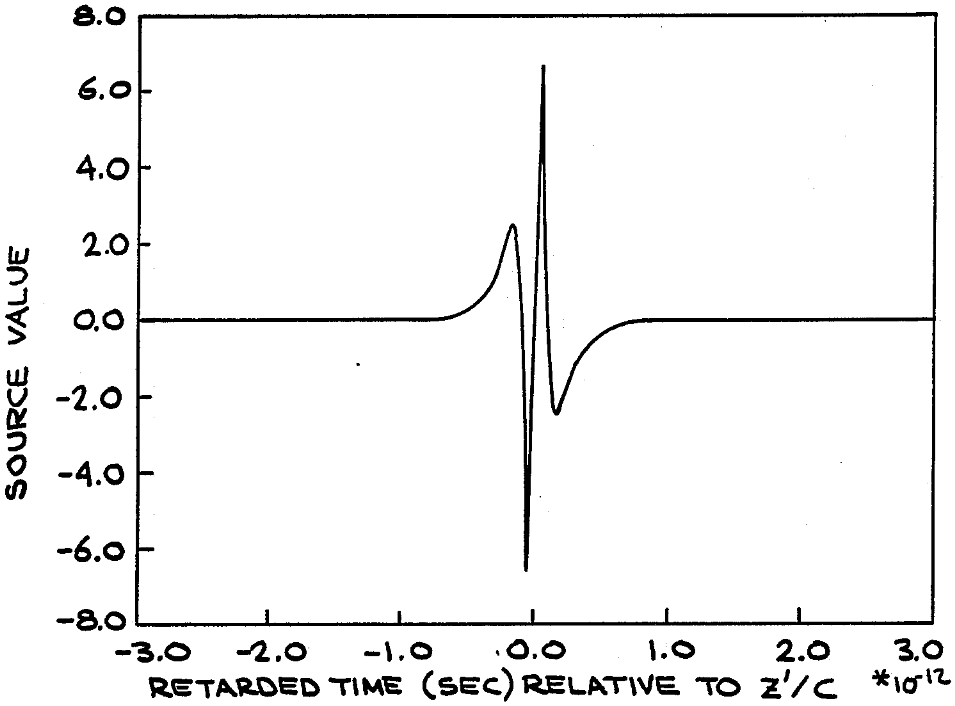
FIGS. 8A, B illustrate a drive function applied to a non-center element of an array, and its frequency spectrum.
Figure 8B:
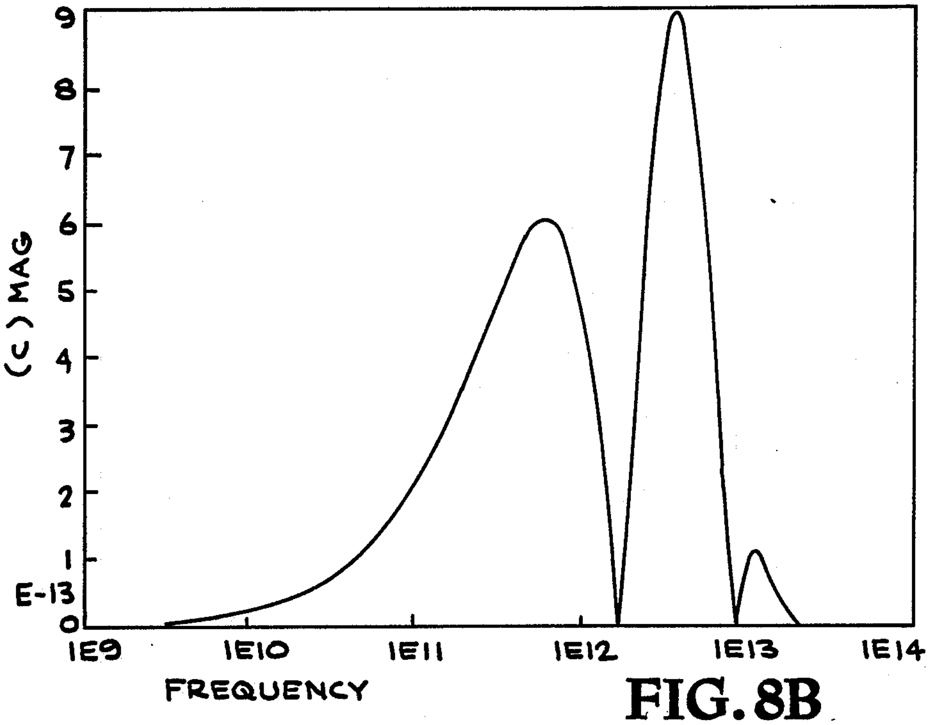
Figure 9A:
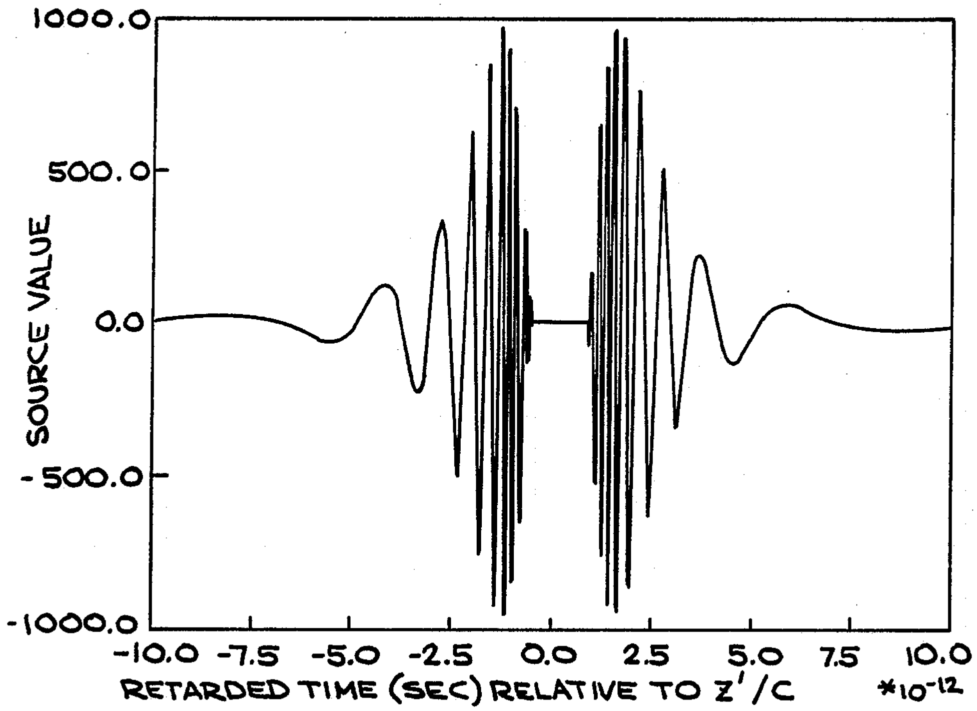
FIGS. 9A, B illustrate a more complex drive function, and its frequency spectrum for a more noncentral element.
Figure 9B:
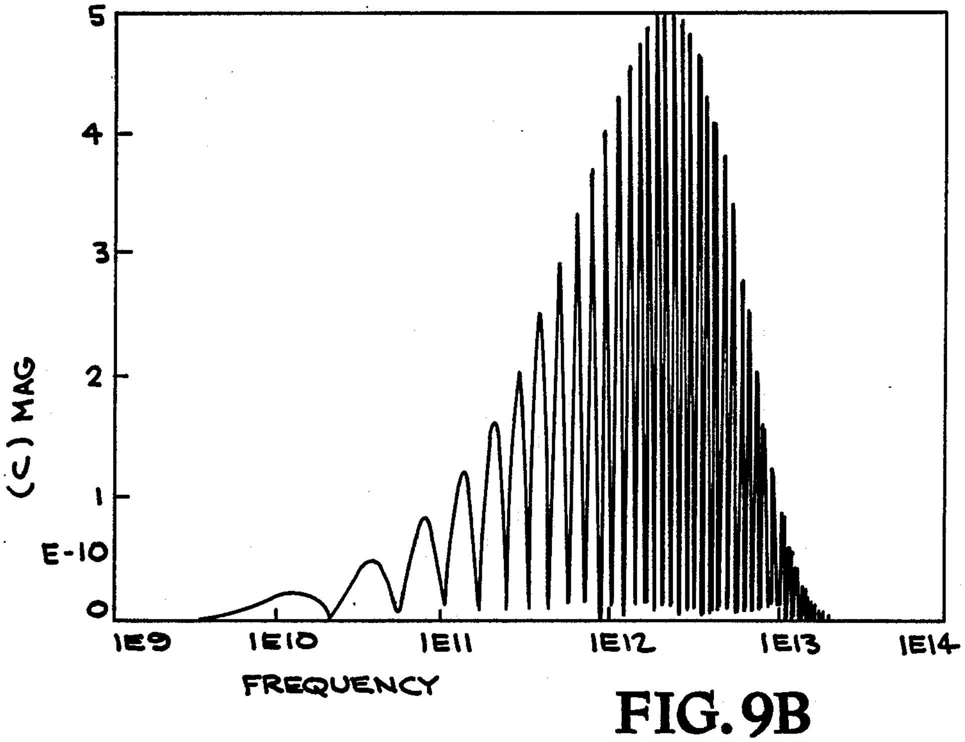

The elements in the array are driven by a waveform determined by Eq. (4) for the particular case of the MPS pulse. The drive functions vary with the positions of the elements in the array. In the more general case, for any selected spectral function F(k), the drive function for each element in the array is determined by Eq. (2). A digital waveform synthesizer can be utilized to generate the appropriate waveforms. FIGS. 7A, B illustrate the drive function at the center of an EDEPT array, and its Fourier spectrum; the spectrum shows the broadbound nature of the excitation. FIGS. 8A, B illustrate the drive function and spectrum applied to another source not at the center; FIGS. 9A and B are a more complex waveform, and its spectrum, applied to a more noncentral source. The spectrum of FIG. 7B forms the envelope of the spectra for all the other driving functions; e.g., the spectrum of FIG. 8B fits within the spectrum of FIG. 7B as does the spectrum of FIG. 9B.

The larger the array, the closer the physically realizeable pulse approximates the theoretical solution. To produce MPS pulses with a rectangular array of (N+1) ×(M+1) equally spaced elements, the drive functions are approximated by $$f(r,t) = -\sum_{n=-N}^{+N}\sum_{m=-M}^{+M}[\Phi(n\Delta x,m\Delta y,z',t-R_{nm}/c)\Delta x\Delta y]\frac{1}{4\pi R_{nm}}, \quad (5)$$

where the array element spacings are Δx and Δy and the distances $$R_{nm}=[(x-n\,\Delta x)^2+(y-m\,\Delta y)^2+(z-z')^2]^{\frac{1}{2}}$$

For a finite circular array with distinct, equally spaced annular sections, the drive function is approximated by $$f(\rho=0,z,t) = -\sum_{n=0}^{+N}[\Phi(\rho_n',z',t-R_n/c)\text{Area}(n)]\frac{1}{4\pi R_n}, \quad (6)$$

where the distances $\rho'_n=n\ \Delta\rho'$ and $R_n=[\rho'_n{}^2+(z-z')^2]^{\frac{1}{2}}$ and the area weighting Area (n)=2 $\pi\rho_n'\ \Delta\rho'$. The function Ψ is related to the function Φ and is calculated from the drive function f by $$\partial f/\partial z'-[\partial f/\partial ct'](z-z')/R-f(z-z')/R^2.$$

Nonuniform spaced arrays can also be used.

Figure 10:
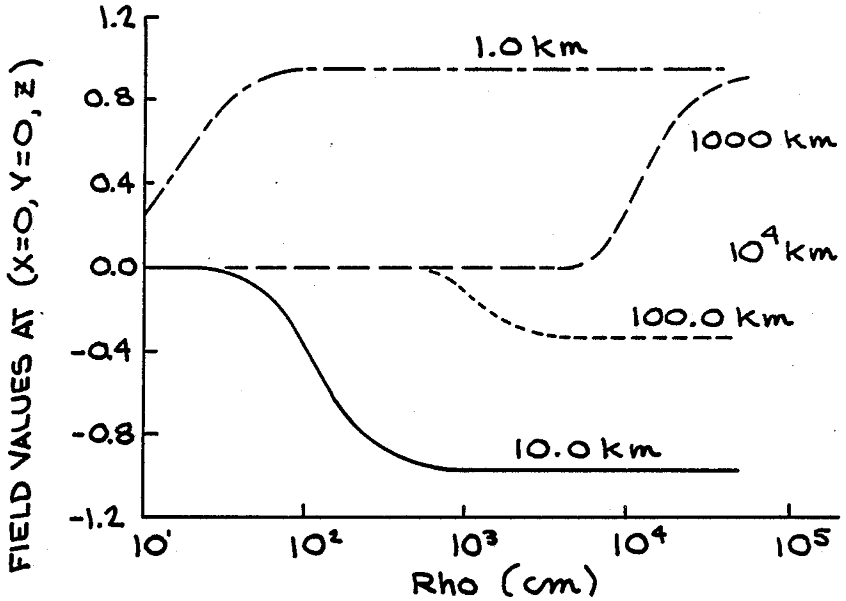
FIG. 10 is a plot of field value or a function of array radius for several axial distances.

A quantitative measure of the size of a circular array needed to reconstruct the MPS pulse at increasingly larger axial distances is shown in FIG. 10. The field values at the axial distances z=1 km, 10 km, 100 km, 1000 km and 10,000 km generated by a finite circular array are plotted against the array radius. The curves become horizontal when the exact field value is reached. The size of the array controls the reconstruction distance. The scaling ratio is approximately a factor of 10 increase in radius size (in cm) for a factor of 10 increase in distance along the direction of preparation (in km). A smaller array does not increase the transverse width of the pulse, but only degrades the reconstruction. As the array size is increased, the pulse definition is enhanced relative to the surrounding fields.

A difficult issue, and probably the one most used as a figure of merit is the distance over which localization will occur for the ADEPT/EDEPT array-launched pulse as compared with traditional fields. There is no exact value for the Rayleigh distance in the case of an ADEPT/EDEPT array because of the broadband pulsed nature of these solutions, which have little in common with the monochromatic radiation on which the Rayleigh-distance concept is based. Whether the Rayleigh distance is dramatically surpassed or is simply reached by the new array may be moot—it depends greatly on the intended application. However, even from a modest size array, energy can be transmitted locally without spreading over significantly large distances.

Array reconstructed MPS pulses are not very sensitive to perturbations in the initial driving functions. An amplitude taper, e.g. a Hanning window, applied to the aperture driving functions actually helps the pulse reconstruction by decreasing the late time oscillations and the source density, with a decrease in peak amplitude. With a slightly larger aperture size and the amplitude taper, a much improved reconstruction of the MPS pulse is achieved. The effect of the taper is to remove all of the low frequency components of the field and to slightly emphasize the high frequency ones. The effect of frequency filtering the driving functions is also positive. Late-time oscillations occur because of the presence of undesirable, ill-behaved higher frequency components which become emphasized in the superposition. The use of a filter to remove some of these unwanted components of the initial driving functions, e.g., a low pass 2nd order Butterworth filter, removes much of the late time noise at a slight cost in the peak value. The application of random Gaussian noise to the individual driving functions also has little adverse effect.

Figures 11A, 11B:
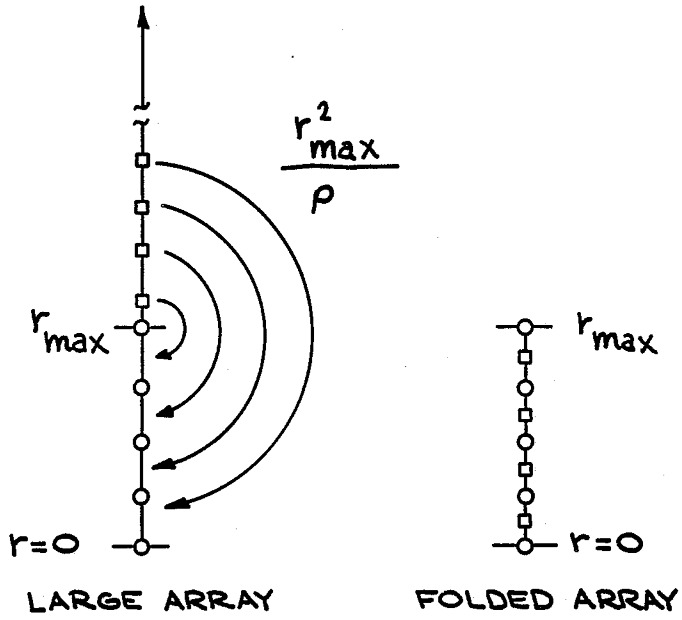
FIG. 11 A, B illustrate the mapping of a large array into a folded array.

One technique of obtaining a large array reconstruct from a smaller array is to use a folded array, as shown in FIGS. 11A, B. The exterior of a planar circular array of radius $r_{max}$ is folded onto its interior with the conformal map $\rho \rightarrow r_{max}^2/\rho$. The folded array may be staggered or unstaggered. The folded array is staggered if, when the interior points are located at $n\Delta\rho$, the mapped exterior points are at $(n+\frac{1}{2})\Delta\rho$; unstaggered if the interior and mapped exterior points coincide. The folding trades a less complicated source distribution for a more complex one. The drive functions for all points in the folded array are determined by their positions in the unfolded array. As an example, the complex drive function of FIGS. 9A, B would be applied to an element which has been folded in near the center of the array.

Figure 12:
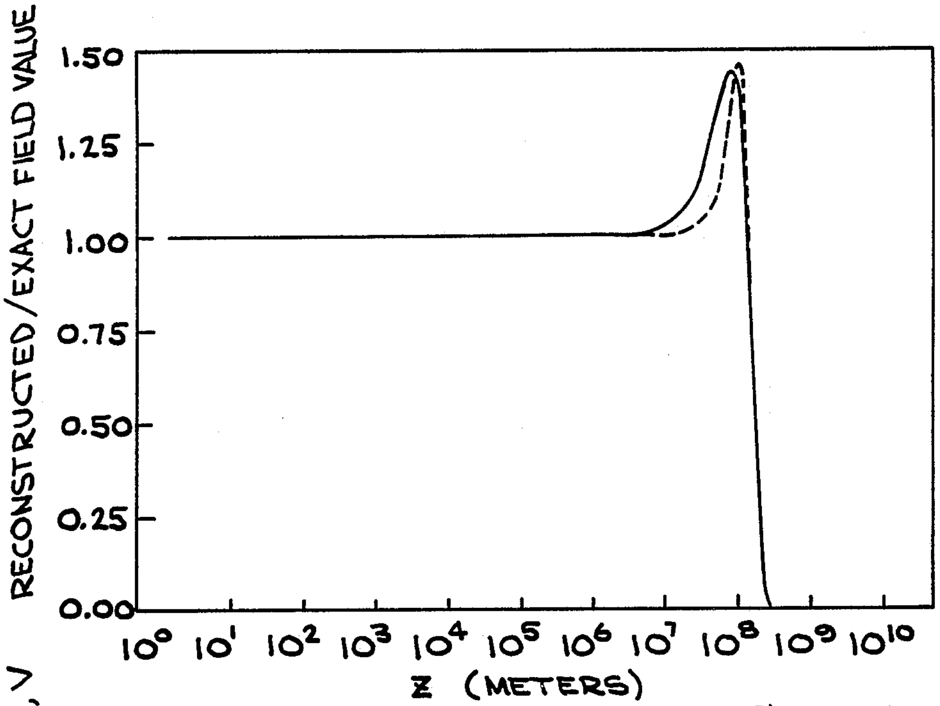
FIG. 12 illustrates the ratio of the reconstructed to exact field value along the direction of propagation for 20,000 element staggered and unstaggered 1.0 m arrays.

The ratio of the reconstructed to exact field valve along the direction of preparation for 20,000 element staggered and unstaggered 1.Om arrays are shown in FIG. 12. A conventional single frequency phased array would only reach to about $10^5$m at best, whereas the arrays of the invention reach beyond $10^8$m, an improvement by a factor of at least 1000.

The invention has been demonstrated in the acoustic regime based on ultrasonic pulses propagating in water. Acoustic directed energy pulse trains (ADEPTs) are localized wave packets which are based on novel solutions to the scaler wave equation which are unique in their intrinsic space-time nature.

Figure 13A:
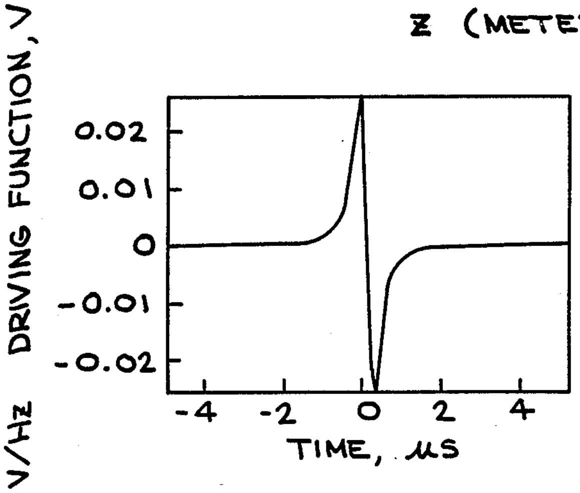
FIGS. 13 A and B show the center drive function, and its frequency spectrum, for an experimental ADEPT array.
Figure 13B:
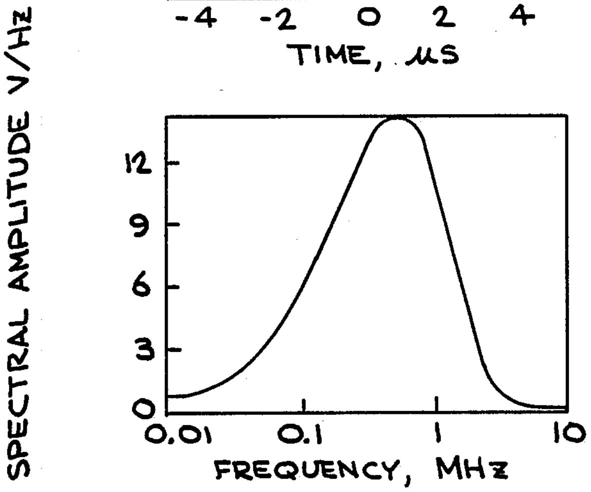

The ADEPTs can be generated with a finite array of radiating elements by specifying both their spatial and their temporal distributions. The driving functions for the array elements are determined by the exact solution and its derivatives. Computer simulations, in particular, a Huygens reconstruction based on a computer model of a finite planar array of point sources reproduces the modified power spectrum (MPS) pulses at large distances away from the array. The array-generated MPS pulse appears to be very robust and insensitive to perturbations in the specified source distributions. These results are also insensitive to the type of array (circular, rectangular, or hexagonal) considered. The feasibility of launching an acoustic MPS pulse travelling at the speed of sound in water (1.5 km/s) is demonstrated experimentally. The ADEPT parameters selected are a=lm, b=600 m, $\alpha=1$, $\beta=300$ and $z_o=0.45$ mm. FIGS. 13 A, B show the associated driving function, and its frequency spectrum, which is applied to the center element of the array.

The pulse parameters are chosen to facilitate the design of an acoustic experiment. Its pulse (waist=1.5 cm) and its spectrum (peak at 0.6 MHz and practically all of its energy below 2.0 MHz), coupled with the choice of array geometry and array element size, permit the desired effects to occur in a distance less than 2 m, the effective length of an available water tank. In particular, with the Rayleigh distance $L_R$ at the peak frequency being 28 cm, there are about $7L_R$ available in the tank.

The pulses are generated with an array that is computationally and experimentally simple and within the scope of limited experimental resources. The latter limitation imposed some significant constraints and dictated the experimental arrangements.

To produce the field generated by an array, it would be necessary to drive each element of the array with the appropriate waveform for that particular element. Thus a generator and transducer for each element would be needed.

In the first stage of the experimental program, the complexity introduced by independent generators and transducers is minimized by constructing a synthetic array. In such a construct, each element of the array is driven individually by its own source, each source having an appropriate waveform; the field generated in this configuration is recorded. This procedure requires only one generator and one transducer (element) at any one time to provide the contribution of a given element to the array performance. After all elements are so driven and their radiated fields recorded, the array field is synthesized by superposition of the fields previously recorded. Thus, it is possible to generate the field radiated by an array by computational reconstruction, using experimentally measured contributions from individual radiators.

An acoustic field detector was used that has a minimal impact on the measured field quantity, i.e., the presence of the detector does not impact the variable being measured. A laser beam/photodiode combination that measures sound-wave induced changes in the refractive index of water was used. The laser beam propagates through the water tank at right angles to the direction of sound propagation and through a window to strike a photodiode. A lens placed between the water tank and the photodiode puts a reduced virtual image of the photodiode within the tank near the sound field. The sound field creates local variations in the optical refractive index of the water in the tank. At low ultrasonic frequencies, the total effect on the optical beam is a phase modulation that occurs at a unique plane as the light beam transverses the sound wave.

The magnitude of the phase modulation is the effective optical path length through the local variations of refractive index. It is the line integral of the refractive index through the regions of optical retardation and speed-up induced by the sound. The intensity of the light propagating across the sound field is proportional to the curvature in the wavefronts, which is, in turn, the second derivative of the phase modulation. The photodetector thus measures the second time derivative of the acoustic field interacting with the laser beam.

Primary interests have been directed toward measuring the fields radiated by an array at a point in space, not along a line, but the detector system measures line integrals of the field. In order to circumvent this problem, the reciprocity principle is used, by which the role of transmitter and receiver can be interchanged without affecting the measured response. That is, the principle of reciprocity is used to interpret the field radiated by a point source and measured by a line detector as the field radiated by a line source and measured by a point detector.

In summary the array is one-dimensional and synthetic and uses reciprocity to reverse the roles of sender and receiver. The practical result is that one can determine the wave that each element of a pulsed array of line sources must radiate to produce an ADEPT pulse by substituting line detectors and irradiating them with waves emanating from point sources that mimic the properties of the ADEPT wave. By synthesizing the array, one can use just one detector and move it to different positions. For each position of the detector a time history of the received pulse is recorded. Then all the different time histories are added up to yield the radiation the array would emit if we were pulsing its elements, each with the wave shape received at its location in the array.

Figure 14:
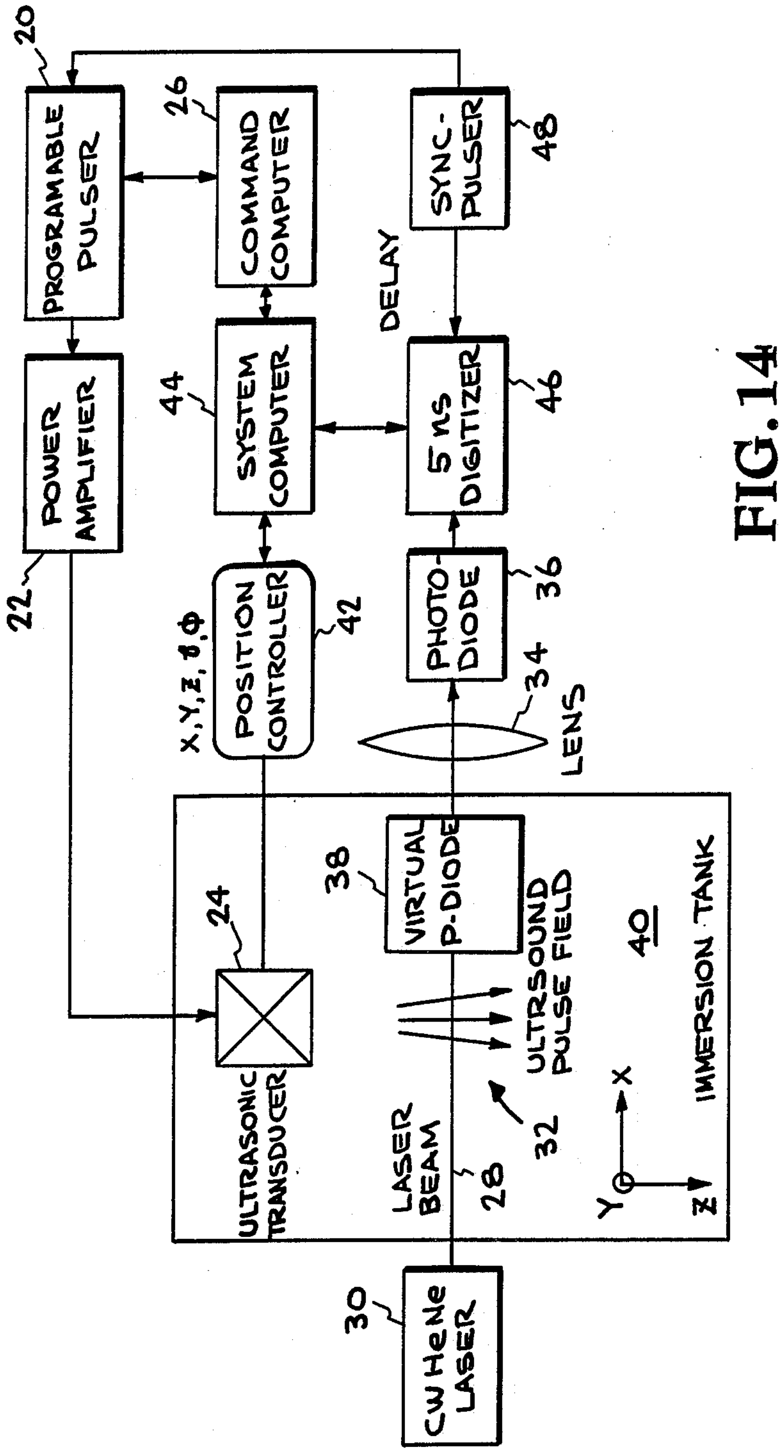
FIG. 14 shows an experimental system to verify localized transmission of ADEPT waves.

The experiment system used to verify localized transmission of ADEPT waves is shown in FIG. 14. The sending system consists of a progammable waveform generator (pulser) 20, a power amplifier 22, and a piezoelectric ultrasonic transducer 24, with a command computer 26 to down-load the different waveforms to the generator 20. The receiving system consists of a laser beam 28 from CW HeNe laser 30 to probe the ultrasound pulse field 32 and a lens 34 -photodiode 36 combination that places a virtual image 38 of the photodiode inside the immersion tank 40 very near the critical plane. The position controller 42 moves the transducer 24 forward and backward, up and down, and sideways to place the virtual image 38 in different parts of the pulse field 32. The system computer 44 issues commands to the pulser 20 through command computer 26 and to the position controller 42 and files data from the photodiode 36 received through digitizer 46. Sync-pulser 48 is connected to pulser 20 and through a delay to digitizer 46.

The sound source consists of a single, commercial ultrasonic transducer designed for nondestructive testing. The transducer is a piezoelectric disk 6.2 mm in diameter, with acoustically matched damping material on its backside, that produces a piston-like motion in the water. For distances greater than 6 cm, the resulting sound beam is in the far field of the transducer. Within the approximations of the design, it is a signal proportional to the third derivative (one from the transducer and two from the optics) of the driving function (the electrical signal applied to the source element) that is eventually acquired by the data acquisition system.

In the coordinate system indicated in FIG. 14, the linear array of the experimental element positions is along the y-axis, the laser measurement is taken along the x-axis, and the direction of propagation is along the z-axis. The synthetic linear array consisted of 21 element positions symmetrically arranged about $y=0$ with 3-mm separation. Thus, 11 driving functions were employed, and the total array width was 6 cm. Time records of length 10.24 $\mu$s were taken. The 176 unique experimental waveforms, launched with a normalized-to-one maximum amplitude, were weighted and superposed to construct the field of the synthetic linear array.

It should be emphasized that, save for multiplying the waveforms by a weighting coefficient dependent on the assumed position in the array for each generated signal, no other processing was applied, either before or after the experiment.

As a control, a Gaussian beam was constructed from the same array with different weights but the same waveform from all array elements. Each element of that array was driven with the center ADEPT driving function and was weighted with a Gaussian amplitude $\exp(-\rho^2/w_o^2)$, where $w_o=1.5$ cm, the same initial transverse waist as the ADEPT. For both the experimental Gaussian control and the corresponding numerical simulations, a Gaussian beam field was fit to the data. The effective frequency was 0.6 MHz, the peak of the spectra of the driving wavefunctions. The effective Rayleigh length for the experiment was thus about 28 cm.

The synthetic linear array experiment is simulated (theoretical ADEPT) by driving each element at (x,y) in a rectangular array with the wavefunction at (O,y). This ensures that the array appears "linear," as does the reciprocal laser diagnostic system. The simulated array is 6 cm$\times$6 cm and contains 441 elements in a 21$\times$21 equally spaced pattern.

Experiments and computer simulations verify the existence, behavior and practical realizability of the ADEPT solutions with the parameters described above. The experimental and theoretical ADEPT results are in excellent agreement. Both show the remarkable retention of the pulse behavior well beyond two Rayleigh distances. The contrast in compactness between the ADEPT pulse and a Gaussian pulse is also evident. Both experimentally and numerically the linear array produces fields that begin to break up after 50 cm, about 2 $L_R$. The rectangular array generated ADEPT avoids this effect because the off-axis elements compensate against any splitting.

Even a simple unoptimized array can reproduce the MPS pulse at significant distances. More optimum designs will reach far beyond the classical Rayleigh length. One more advanced design squeezes a large array into a smaller one. One way is to drive the array with a more complicated set of pulse shapes whose functions are derived from the ADEPT solution within the array distance and beyond it. The solutions beyond the maximum distance are "folded" into the interior of the array in a particular way, trading a simple source distribution for a much more complicated one.

The results of this maneuver on the array-launched ADEPT field is dramatic. Localization for the above case out to about 10 m is obtained which is more than 30 $L_R$.

The unique aspect of the ADEPT/EDEPT solutions is their intrinsic space-time nature. An MPS pulse can be designed to recover it initial amplitude after propagating very large distances while spreading very little. The pulse moves virtually unchanged in the "near" zone, "sloshes" about the pulse center in the "intermediate" zone, recovering its initial amplitude at intervals out to very large distances, and finally falls off as inverse distance in the "far" zone. These pulses can be produced with a finite array of radiating elements individually driven with appropriately shaped pulses. A Huygens reconstruction based on the causal, time-retarded Green's function and a finite planar array of point sources reproduced the MPS pulses at large distances. The array-generated MPS pulse appears to be very robust and insensitive to perturbations in the initial source distributions.

The physical realization of new solutions of Maxwell's equations and the wave equation provide the possibility of propagating localized pulses of electromagnetic or acoustic energy over long distances without loss. Such localized transmissions could have applications in communications, remote sensing, power transmission, and directed-energy weapons.

Changes and modifications in the specifically described embodiments can be carried out without departing from the scope of the invention which is intended to be limited only by the scope of the appended claims.

I claim:

1. A method of producing a localized packet of wave energy which travels substantially large distances compared to the Rayleigh length without substantial divergence, comprising:

independently driving each element of a finite array of radiating elements with a drive function determined by $$f(r,t) = \int_0^\infty \Phi_k(r,t)F(k)dk$$

where $\Phi_k(r,t)$ is a basis function which is an exact or approximate non-separable space-time solution of the relevant wave propagation equation and F(k) is a spectrum function which satisfies $$\int_0^\infty dk\ |F(k)|^2 e^{2kse} E_1(2kz_0) <$$

$$\frac{1}{2z_0} \int_0^\infty dk\ |F(k)|^2 \frac{1}{k} < \infty,$$

2. The method of claim 1 wherein $$\Phi_k(r,t) = e^{ik(s+ct)} \frac{e^{-k\rho^2/[ze+i(s-ct)]}}{4\pi i[z_0 + i(z-ct)]},$$

and $$f(r,t) = \frac{1}{4\pi i[z_0 + i(z-ct)]} \int_0^\infty dk\ F(k)e^{-ks(\rho,z,t)},$$

where $s(\rho,z,t)=\rho^2/[z_o+i(z-ct)]-i(z+ct)$.

3. The method of claim 2 wherein F(k) is a modified power spectrum $$F(k)=4\pi i\beta(\beta k-b)^{\alpha-1}e^{-\alpha(\beta k-b)}H(k-b/\beta)/\Gamma(\alpha)$$

where $H(k-b/\beta)$ is Heaviside's function and $\Gamma(\alpha)$ is the Gamma function, and $$f(r,t) = Re\left[\frac{1}{z_0 + i(z-ct)} \frac{1}{\left(\frac{s}{\beta}+\alpha\right)^{\alpha}} e^{-bs/\beta}\right],$$

4. The method of claim 1 comprising forming the radiating elements of broadband sources.

5. The method of claim 4 comprising forming the radiating elements of piezoelectric transducers.

6. The method of claim 4 comprising forming the radiating elements of microwave sources.

7. The method of claim 1 further comprising folding the finite array of radiating elements into a compact folded array of preselected maximum dimensions.

8. The method of claim 1 further comprising forming the array in a planar geometry.

9. The method of claim 8 comprising forming the array in a circular, square or hexagonal array.

10. The method of claim 1 further comprising forming the drive functions with a digital waveform synthesizer.

11. Apparatus for producing a localized packet of wave energy which travels substantially large distances compared to the Rayleigh length without substantial divergence, comprising:

a finite array of radiating elements;

driving means associated with each radiating element of the array which apply a driving function $$f(r,t) = \int_0^\infty \Phi_k(r,t)F(k)dk$$

where $\Phi_k(r,t)$ is an exact or approximate non-separable space-time solution of the relevant wave propagation equation and F(k) is a preselected spectrum function which satisfies $$\int_0^\infty dk\ |F(k)|^2 e^{2kse} E_1(2kz_0) <$$

$$\frac{1}{2z_0} \int_0^\infty dk\ |F(k)|^2 \frac{1}{k} < \infty,$$

12. Apparatus of claim 11 wherein $$\Phi_k(r,t) = e^{ik(s+ct)} \frac{e^{-k\rho^2/[ze+i(s-ct)]}}{4\pi i[z_0 + i(z-ct)]},$$

and $$f(r,t) = \frac{1}{4\pi i[z_0 + i(z-ct)]} \int_0^\infty dk\ F(k)e^{-ks(\rho,z,t)},$$

where $s(\rho,z,t)$ 32 $^2/[z_o+i(z-ct)]-i(z+ct)$.

13. Apparatus of claim 12 wherein F(k) is a modified power spectrum $$F(k)=4\pi i\beta(\beta k-b)^{\alpha-1}e^{-\alpha(\beta k-b)}H(k-b/\beta)/\Gamma(\alpha)$$

where $H(k-b/\beta)$ is Heaviside's function and $\Gamma(\alpha)$ is the Gamma function, and $$f(r,t) = Re\left[\frac{1}{z_0 + i(z-ct)} \frac{1}{\left(\frac{s}{\beta}+\alpha\right)^{\alpha}} e^{-bs/\beta}\right],$$

14. Apparatus of claim 11 wherein the radiating elements are broadband elements.

15. Apparatus of claim 14 wherein the radiating elements are piezoelectric transducers.

16. Apparatus of claim 14 wherein the radiating elements are microwave sources.

17. Apparatus of claim 11 wherein the array is a folded array.

18. Apparatus of claim 11 wherein the array is a planar array.

19. Apparatus of claim 18 wherein the array is a circular, square, or hexagonal array.

20. Apparatus of claim 11 wherein the driving means includes a digital waveform synthesizer.

* * * * *

US004959559B1

REEXAMINATION CERTIFICATE (1933rd)

United States Patent [19]

Ziolkowski

[11] B1 4,959,559

[45] Certificate Issued Feb. 23, 1993

[54] ELECTROMAGNETIC OR OTHER DIRECTED ENERGY PULSE LAUNCHER

[75] Inventor: Richard W. Ziolkowski, Livermore, Calif.

[73] Assignee: The United States of America as represented by the Secretary of the Department of Energy, Washington, D.C.

Reexamination Request:
No. 90/002,582, Feb. 14, 1992

Reexamination Certificate for:

| | |
|---|---|
| Patent No.: | **4,959,559** |
| Issued: | **Sep. 25, 1990** |
| Appl. No.: | **331,141** |
| Filed: | **Mar. 31, 1989** |

[51] Int. Cl.$^5$ ......................... H01Q 3/26; H04B 1/12; H01S 3/23; H01S 3/20

[52] U.S. Cl. .................................... 307/425; 307/510; 307/522; 342/14; 342/13; 342/81; 364/822; 315/409

[58] Field of Search .............................. 307/425, 430; 250/493.1, 494.1; 89/1.111; 342/13, 14, 81

[56] References Cited

U.S. PATENT DOCUMENTS

| | | | |
|---|---|---|---|
| 4,032,922 | 6/1977 | Provencher | 343/854 |
| 4,216,475 | 8/1980 | Johnson | 343/100 |
| 4,270,223 | 5/1981 | Marston | 455/305 |
| 4,321,550 | 3/1982 | Evtuhov | 330/4.3 |
| 4,342,949 | 8/1982 | Harte et al. | 315/409 |
| 4,595,994 | 6/1986 | Verber et al. | 364/841 |
| 4,641,259 | 2/1987 | Shan et al. | 364/724 |
| 4,656,601 | 4/1987 | Merritt et al. | 364/821 |
| 4,779,984 | 10/1988 | Cook | 356/346 |
| 4,806,888 | 2/1989 | Salvage et al. | 333/138 |

OTHER PUBLICATIONS

Ziolkowski, "New Electromagnetic Directed Energy Pulses", SPIE vol. 873, Microwave and Particle Beam Sources and Propagation, Jan. 1988, pp. 312–319, published May 1988.

*Primary Examiner*—Timothy P. Callahan

[57] ABSTRACT

The physical realization of new solutions of wave propagation equations, such as Maxwell's equations and the scaler wave equation, produces localized pulses of wave energy such as electromagnetic or acoustic energy which propagate over long distances without divergence. The pulses are produced by driving each element of an array of radiating sources with a particular drive function so that the resultant localized packet of energy closely approximates the exact solutions and behaves the same.

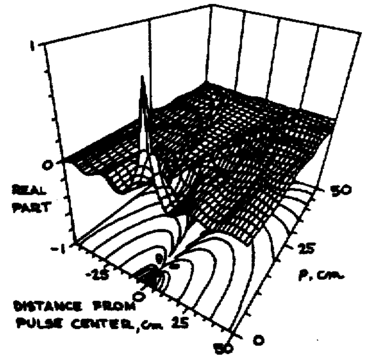

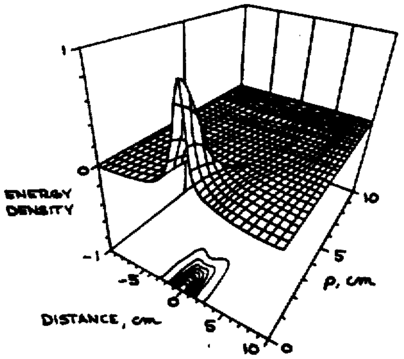

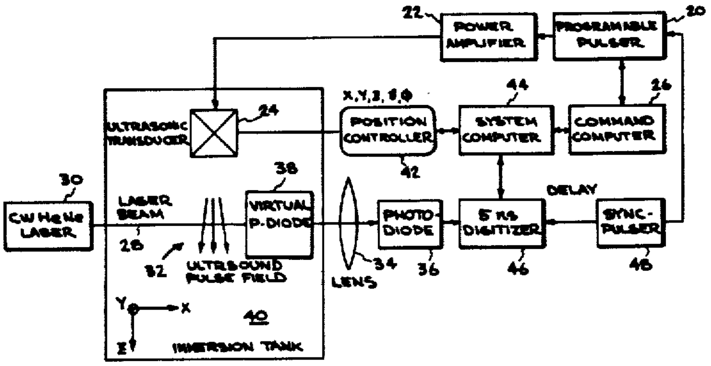

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *